United States Patent [19]

Patil

[11] Patent Number: 4,799,158
[45] Date of Patent: Jan. 17, 1989

[54] SYSTEM FOR COMPUTER CONTROLLED SHIFTING OF AN AUTOMATIC TRANSMISSION

[75] Inventor: Prabhakar B. Patil, Detroit, Mich.

[73] Assignee: Ford Motor Company, Dearborn, Mich.

[21] Appl. No.: 867,177

[22] Filed: May 27, 1986

[51] Int. Cl.$^4$ .................................... B60K 41/06
[52] U.S. Cl. .................................... 364/424.1; 74/866
[58] Field of Search .................................... 364/424.1, 426; 74/866–869

[56] References Cited

U.S. PATENT DOCUMENTS

| | | | |
|---|---|---|---|
| 4,031,782 | 6/1977 | Miller et al. | 364/426 |
| 4,102,222 | 7/1978 | Miller et al. | 74/866 |
| 4,106,368 | 8/1978 | Ivey | 364/424 |
| 4,350,058 | 9/1982 | Miller et al. | 74/861 |
| 4,361,060 | 11/1982 | Smyth | 364/424.1 |
| 4,418,777 | 12/1983 | Stockton | 180/65 E |
| 4,502,354 | 3/1985 | Suzuki et al. | 74/806 |
| 4,503,734 | 3/1985 | Acker | 74/866 |
| 4,505,368 | 3/1985 | Ackermann et al. | 192/0.092 |
| 4,514,811 | 4/1985 | Daubenmier et al. | 364/424.1 |
| 4,527,678 | 7/1985 | Pierce et al. | 192/3.58 |

OTHER PUBLICATIONS

"Computer Controlled Shifting of an Automatic Transmission" by P. B. Patil presented to Institute of Mechanical Engineers, Oct. 29–Nov. 1, 1985.
"Advanced Electric Vehicle Power Train Program" by Ford Motor Company & General Electric Company, Technical Report Phase I & II; Nov. 1984.

Primary Examiner—Parshotam S. Lall
Assistant Examiner—V. N. Trans
Attorney, Agent, or Firm—Frank G. McKenzie; Donald J. Harrington

[57] ABSTRACT

In an automotive vehicle having an automatic transmission that driveably connects a power source to the driving wheels, a method to control the application of hydraulic pressure to a clutch, whose engagement produces an upshift and whose disengagement produces a downshift, the speed of the power source, and the output torque of the transmission. The transmission output shaft torque and the power source speed are the controlled variables. The commanded power source torque and commanded hydraulic pressure supplied to the clutch are the control variables. A mathematical model is formulated that describes the kinematics and dynamics of the powertrain before, during and after a gear shift. The model represents the operating characteristics of each component and the structural arrangement of the components within the transmission being controlled. Next, a close loop feedback control is developed to determine the proper control law or compensation strategy to achieve an acceptably smooth gear ratio change, one in which the output torque disturbance is kept to a minimum and the duration of the shift is minimized. Then a computer algorithm simulating the shift dynamics employing the mathematical model is used to study the effects of changes in the values of the parameters established from a closed loop control of the clutch hydraulic and the power source torque on the shift quality. This computer simulation is used also to establish possible shift control strategies. The shift strategies determine from the prior step are reduced to an algorithm executed by a computer to control the operation of the power source and the transmission.

9 Claims, 2 Drawing Sheets

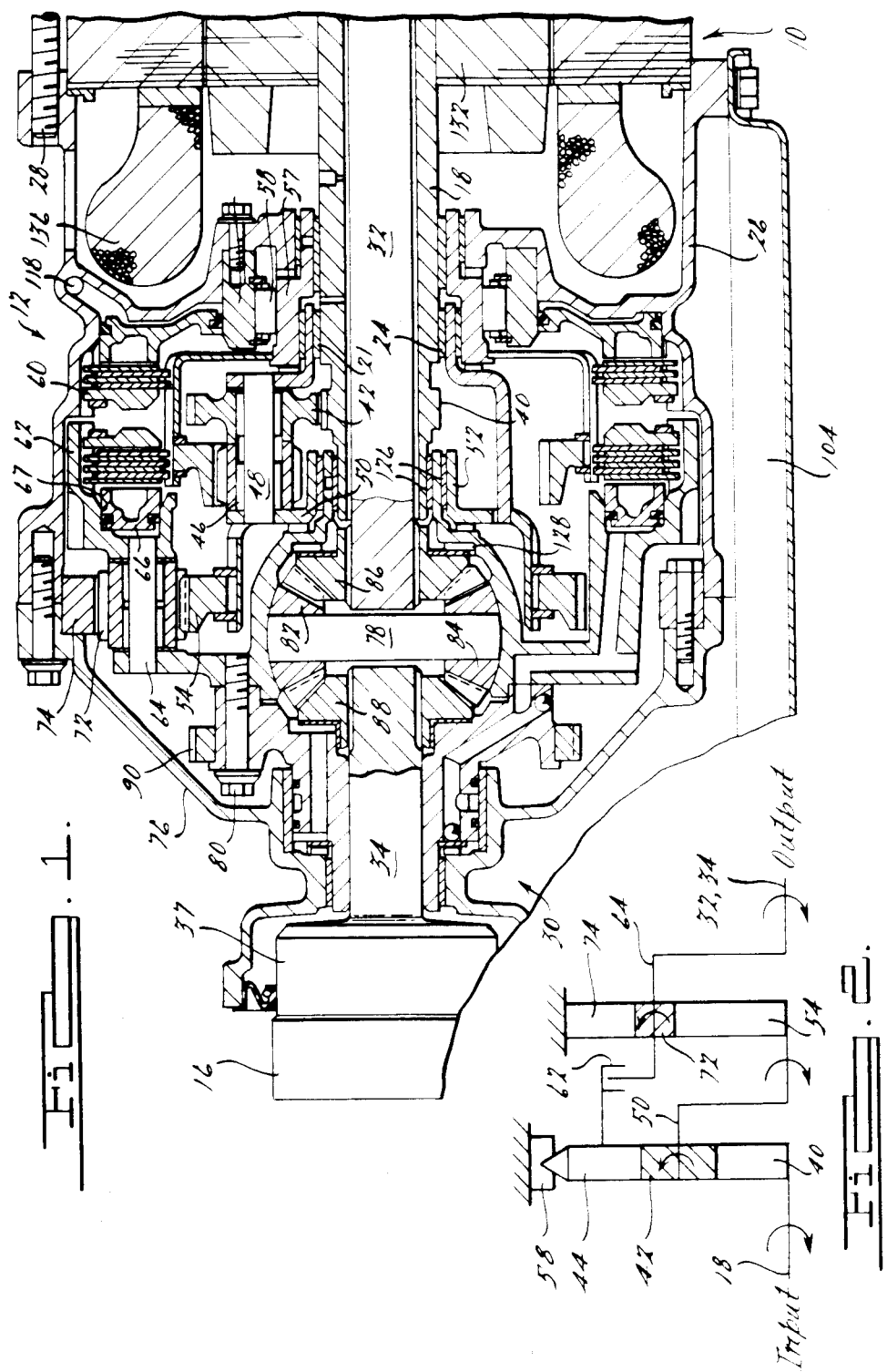

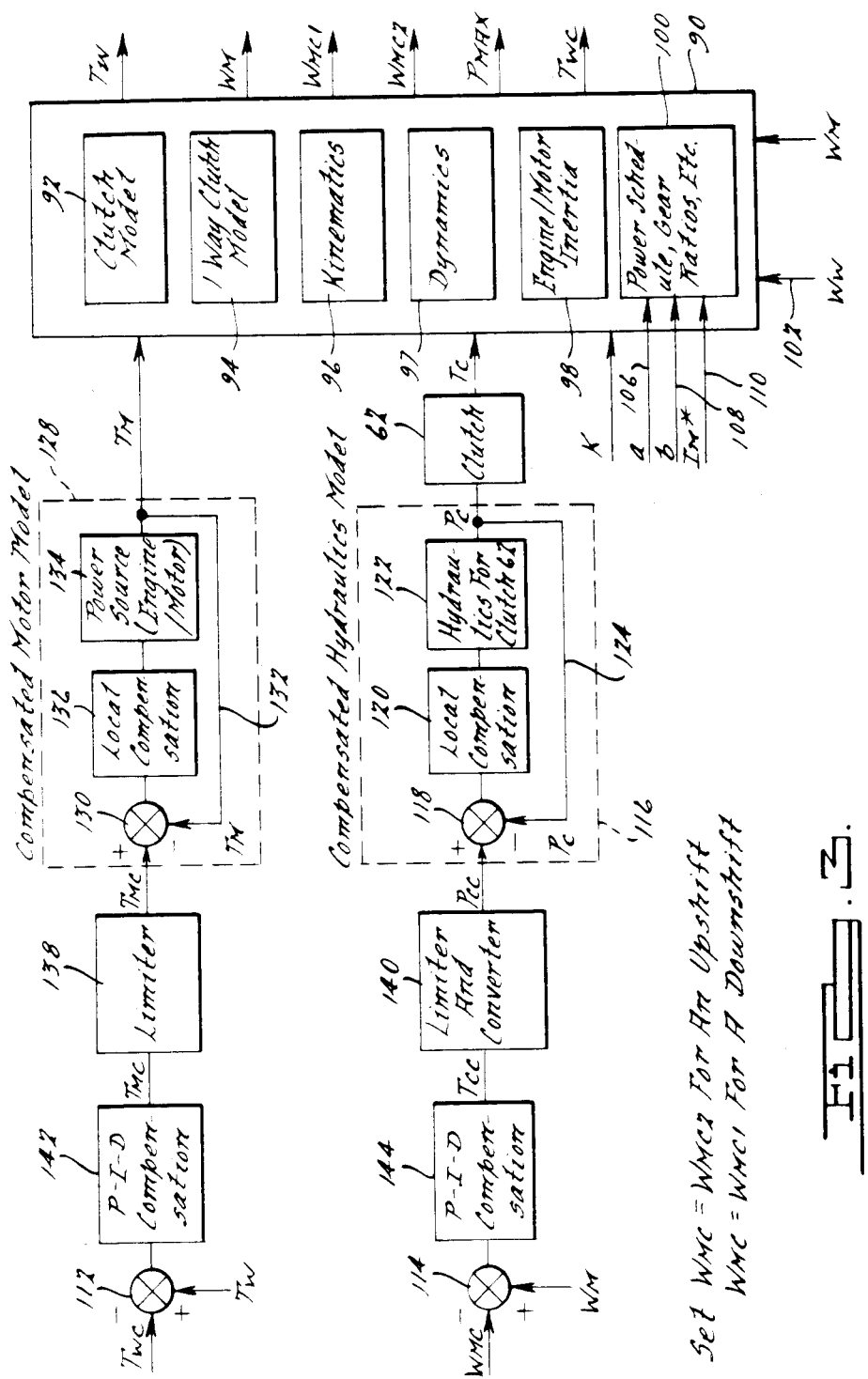

SYSTEM FOR COMPUTER CONTROLLED SHIFTING OF AN AUTOMATIC TRANSMISSION

The Government has rights in this invention pursuant to Contract No. DE-AC08-82NV10308 awarded by the U.S. Department of Energy.

BACKGROUND OF THE INVENTION

1. Field of the Invention

This invention relates to a control system for an automatic transmission of the type having a planetary gearset and a hydraulically actuated clutch that selectively holds components of the gearset to produce the various drive ratios of the transmission. More particularly, the present invention relates to a control system having two feedback loops, one loop for producing the torque carried by the clutch in accordance with the difference between the commanded and actual power source speeds and a second loop for producing a power source torque in accordance with the difference between commanded and actual drive wheel torques.

2. Description of the Prior Art

Hydraulically actuated, mechanically driven automatic transmissions generally include a turbine driven hydrodynamically from the impeller of a torque converter, the turbine transmitting power to the gearset to produce the forward drive gear ratios. When any forward or reverse gear ratio is selected, though the vehicle is coasting or standing at idle, the engine transmits torque through the torque converter, various clutches and gears to the drive wheels. Automatic transmissions can have the gear ratio changes produced as a result of repetitively executing an algorithm that determines when the transmission is to be shifted and the gear ratio to which the gear shift is to be made.

To improve the efficiency of the powertrain, it is desirable to eliminate the torque converter used in an automatic transmission and to schedule the shifts using an onboard computer to optimize the efficiency of the power source whether it be an internal combustion engine or an electric motor. Because the shifts are scheduled by the computer and not initiated or expected by the driver, and because there is no torque converter to absorb sudden torque changes, it is essential that the shift sequence and the torque during the shift be carefully controlled to minimize the wheel torque changes during the shift. The control technique, according to this invention, has been developed to control the power source torque, and the torque transmitted by the clutch of an automatic transmission to achieve smooth shifts in an acceptably brief period so that the service life of the clutch is consistent with the service life of the transmission.

SUMMARY OF THE INVENTION

The method according to this invention controls the gear ratio changes of a motor vehicle multiple gear ratio, automatic transmission that driveably connects a power source to the drive wheels of the vehicle. The power source, which may be either an electric motor or an internal combustion engine, is adapted to produce an output torque that is transmitted directly to the input of the transmission. The drive wheels of the transmission are connected directly or indirectly to the output of the transmission. The method includes mathematically modeling the kinematic and dynamic characteristics of the power source and of the components of the transmission that are actuated hydraulically or otherwise to produce the various gear ratio changes. Next a determination is made of the local compensation required to produce a torque response of the power source to a command such that the torque response requirement of the system can be satisfied. A similar determination is made of the local compensation required to produce a clutch response to a torque or pressure command that is transmitted to the gear ratio changing components of the transmission such that the response requirements of the system can be satisfied. Generally, the criteria for the system response requirements include maintaining a nearly constant wheel torque and producing the gear ratio within a relatively short period of time that is long enough to avoid abrupt, harsh shifting yet short enough to avoid excessive wear of the transmission clutches.

When the local compensation requirements are established, the clutch torque that can be produced in response to a gear ratio change command is determined in accordance with the local clutch torque compensation. Then the wheel torque of the transmission is determined from the mathematical model of the dynamic characteristics and the desired speed of the power source is determined from the mathematical model of the kinematic characteristics of the transmission gear ratio changing components.

This technique is implemented with a closed loop feedback control system whose control variables are the torque command for the power plant and the hydraulic pressure commands to the hydraulic control or actuating elements. The variables being controlled are the wheel torque and the power plant speed.

The mathematical model is simulated using algorithms stored in an electronic memory that is accessible to the central processing unit of an electronic computer. Certain known parameters of the power plant and of the transmission are supplied continuously as input data to the input ports of the computer.

A determination is made of the required compensation for the wheel torque feedback loop. A determination is made of the compensation for the power source speed feedback loop required to produce an acceptable power plant torque command and a clutch pressure command. These commands are supplied as input to the respective local compensation loops.

The procedure, according to this invention, yields control strategy solutions that are far more quickly, economically and less destructively implemented than conventional calibration procedures using actual hardware. According to this method, the effects of changes in component characteristics, such as gear ratio changes, shift schedule changes, engine torque calibration changes, and shift quality changes can be quickly evaluated and a new control compensation determined if necessary.

Furthermore, this technique can be effectively used to determine whether it is possible to achieve shift quality objectives with the existing characteristics of the power plant and the hydraulic control of the transmission and their local associated compensation. For example, it may be necessary to have a clutch pressure response time of 50 ms in order to achieve a required shift quality. This system can be used to determine the requisite response time to establish the criteria for a redesign of the hydraulic system or a change of the local compensation that would realize the system objectives.

BRIEF DESCRIPTION OF THE DRAWINGS

FIG. 1 is an elevation cross section through the centerline of an automatic power transmission whose gear ratio changes are adapted for use with the control according to this invention.

FIG. 2 shows schematically the gear arrangement and clutches of the transmission of FIG. 1.

FIG. 3 is a schematic diagram of the control according to this invention.

DESCRIPTION OF THE PREFERRED EMBODIMENT

An a.c. induction motor 10 is mounted coaxially with a two-speed planetary automatic transmission 12 and constant velociy joints 16, which transmit power to the right and left drive wheels of the vehicle. The rotor shaft 18 of the motor is a sleeve shaft supported at one end on a bearing whose outer race is supported on the motor casing. The opposite end of the motor shaft is journalled at 24 on a support surface of the transmission casing 26, which is joined to the motor casing by attachment bolts 28.

The differential mechanism 30 transmits torque to a first drive shaft 32 that extends coaxially with the transmission and motor and is located within and supported on the inner surface of the rotor shaft 18. A second drive shaft 34 transmits torque to the inner constant velocity joint 16 of a half-shaft assembly that transmits power to the left drive wheel of the vehicle. Oil seals 37 seal the lubrication system adjacent the bearing and the support surface for the second driveshaft 34.

The two-speed planetary automatic transmission for use with the motor 10 has a first stage that includes a sun gear 40 that may be formed integrally with the rotor shaft 18. Multiple planetary pinions 42 located in the annular space within the ring gear 44 are in continuous meshing engagement with sun gear 40 and the ring gear 44. Each pinion 42 is mounted for rotation by needle bearings 46 on a shaft 48 that is supported at each end by a planelary pinion carrier 50. Carrier 50 is splined at 52 to an axially extending portion of a second sun gear 54 that is a part of second transmission stage. The mounting flange for pin 43 at the opposite axially end of carrier 50 is rotatably supported on the annular portion 56 of the transmission casing upon which the rotor shaft is journalled at 24.

Ring gear 44 is connected to the inner driver element 57 of an overrunning clutch 58 whose outer driven element 50 is secured to the transmission casing against rotation. Ring gear 44 is also connected to a disc clutch 60 that operates to produce reverse drive, hill braking in low gear and regenerative braking. When clutch 60 is applied, ring gear 44 is fixed to the transmission casing against rotation. Another hydraulically actuated clutch, the high gear clutch 62, operates to connect ring gear 44 to the carrier 64 of the second transmission stage. Clutch 62 includes a piston 66 that moves within a cylinder 67. Return springs 68 located within the annulus of the clutch operate to return piston 66 to the position shown in FIG. 1 when hydraulic pressure is removed from cylinder 67. When piston 66 is actuated by hydraulic fluid, the discs of the clutch are forced into frictional engagement with discs that are connected to carrier 64 upon which the planetary pinions of the second stage are mounted by pin 70. High gear clutch 62 produces a driving connection between ring gear 44 and the carrier 64.

The second transmission stage includes the second sun gear 54 which is in continuous meshing engagement with multiple second stage planetary pinions 72 that are located within the annular region defined by the second ring gear 74. Pinions 72 are mounted for rotation on shaft 70 which is supported on the second stage carrier 64. Ring gear 74 is permanently fixed against rotation to a second portion of the transmission housing 76 that is mechanically joined to the first transmission housing 26.

The differential mechanism 30 includes a bevel pinion shaft 78 that is joined by multiple roll pins 80 to the carrier 64 of the second transmission stage. Upper and lower bevel pinions 82, 84 fixed securely to pinion shaft 78, are held in continuous meshing engagement with bevel gears 86, 88, respectively, that are splined to the driveshafts 32, 34. A parking gear 90 integrally formed with carrier 64 operates to prevent rotation of driveshafts 32, 34 because it is fixed by the pin 80 to bevel pinion shaft 78.

To disposition the transmission for first gear forward speed operation neither of the friction disc clutches need be engaged. Instead, overrunning clutch 58 is arranged so that its inner race or driving member 57 transmits torque to the outer race 59, thus fixing ring gear 44 against rotation by way of the fixed connection between the outer race and the transmission casing. Pinion carrier 50, the driven member of the first stage, transmits power to the second sun gear 54 through the spline connection 52. The second planetary stage has its ring gear 74 permanently fixed against rotation, therefore, the planetary pinion carrier 60 is the driven element of the second stage. The bevel pinion shaft 78 rotates about the central axis of the transmission as carrier 64 rotates. Power is therefore transmitted to the driveshafts 32, 34 by way of the engagement of the bevel pinions 82, 84 with the bevel gears 86, 88.

High speed ratio results when high gear clutch 62 is engaged and clutch 60 is disengaged. When this occurs, overrunning clutch 58 does not operate to lock ring gear 44 to the transmission casing, but rather connects ring gear 44 to pinion carrier 64. Pinion carrier 50 of the first stage is permanently connected to sun gear 54 on the second stage through spline 52. The torque delivery path for high speed ratio operation includes the first sun gear 40, which is driven by the rotor shaft 18; the first planet pinion carrier 50, which drives the second sun pinion 54; and the first ring gear 44, which is driveably connected by clutch 62 to the second planet pinion carrier 64. The second ring gear 74 fixed to the transmission casing provides the torque reaction for the transmission in high gear. Pinion carrier 64 drives the bevel pinion shaft 78 in rotation about the central axis of the transmission and bevel pinions 82, 84 drive bevel gear 86, 88 thereby transmitting power to the driveshafts 32, 34.

Reverse drive results when the rotational direction of the motor is reversed and reverse clutch 60 is applied. When the direction of the motor is reversed, clutch 58 overruns but first ring gear 44 is fixed against rotation when the reverse clutch 60 is applied. In this instance, the torque delivery path is identical to that of the low speed ratio forward drive previously described. Rotor shaft 18 drives the sun gear 40 and first planet carrier 50 drives the second sun gear 54. The first and second ring gears are fixed against rotation and provide torque reaction points for the transmission. Output power is transmitted by the second planetary carrier 64 to the bevel pinion shaft 78 which transmits torque to the driveshafts 32, 34.

In FIG. 2, components of the first and second planetary gear units have the same identifying numbers as the components shown in FIG. 1 to which they correspond. Rotor shaft 18 transmits drive from the electric motor 10 to the first sun gear 40. The first ring gear is connected to the driving elements of the overrunning clutch 58 whose driven element is fixed to the transmission casing against rotation. The first planet pinion set is rotatably mounted on the carrier 50, which drives the second sun gear 54. A second set of planet pinions is rotatably mounted on a carrier 64 which drives a third sun gear 92. The ring gear 74 of the second planetary unit can be selectively fixed against rotation by way of reverse clutch 94. Similarly, the second ring gear may be selectively connected by application of high speed ratio clutch 96 to a third planet pinion carrier 98 on which a third set of planetary pinions 100 is rotatably mounted. The third ring gear 102 is permanently fixed to the transmission casing against rotation.

First speed ratio results although neither clutch 94 or 96 is applied. Instead, overrunning clutch 58 fixes the first ring gear against rotation and provides a second torque reaction point in addition to that of third ring gear 102. Carrier 50, which drives the second sun gear 54, is the driven element of the first planetary set. Carrier 64, which drives the third sun gear 92 is the driven element of the second planetary gear set. Finally, the third pinion carrier 98 drives the bevel pinion shaft 78, which distributes power to the driveshafts 32, 34.

High speed ratio operation results when the high speed ratio clutch 96 is applied and the reverse clutch 94 is inoperative. In this case, ring gear 102 provides the only torque reaction point for the transmission, since clutch 58 is overrunning. Carrier 50, the driven element of the first gear set, drives the second sun gear 54. Carrier 64, the driven element of the second gear set, drives sun gear 92. The first and second ring gears 44, 74 are driveably connected through clutch 96 to the third pinion carrier 98, which drives the bevel pinion shaft 78.

The mathematical relationships between the rotation speed of the power source and the rotational speed of the transmission and between the power source torque and the transmission output torque that exists during operation of the powertrain in each of the gear ratios and during gear ratio changes can be formulated from the information shown in FIG. 2. For example, recognizing that the tangential velocities of the meshing gears are equal, the following equation relates the transmission output speed to the speed of the power source:

$$W_m = W_w(1+a)(1+b) - a \cdot W_{rl} \quad (1)$$

where a is the ratio of the diameter of ring gear 44 to sun gear 40; b is the ratio of the diameters of ring gear 74 to sun gear 54; $W_m$ is the motor speed; $W_w$ is the speed of output shaft 32 and $W_{rl}$ is the speed of ring gear 44. This relationship is valid generally during operation in the first and second gear ratios and during a gear ratio change. However, during operation in the first gear ratio with one-way clutch 58 locked, $W_{rl}$ is equal to 0; therefore $$W_m = W_w(1+a)(1+b) \quad (2)$$

During the gear ratio change, when the one-way clutch overruns and clutch 62 is slipping, the rate of change of motor speed is related to the rate of change of ring gear speed by the following equation, which is derived by differentiating equation 1.

$$dW_m/dt = -a(dW_{rl}/dt)$$

In differentiating equation 1, it was assumed that $W_w$ is equal to a constant during the shift. This assumption is reasonable because the large inertia of the vehicle permits the vehicle speed to change only very little when the shift interval is in the order of 0.5 seconds.

In second gear with clutch 62 engaged $$W_{rl} = W_w$$

and $$W_m = W_w[(1+a)(1+b) - a] \quad (3)$$

On the basis of the torque balance at each pair of meshing gears and neglecting the small inertia of the pinions, the following equation expresses the dynamic relationship of the output shaft torque to the torque of the power source, the one-way clutch 58, and clutch 62.

$$T_w = [(I^*_m - I_m)(1+a)(1+b)T_m]/I^*_m + [I_m(1+a)(1+b)(T_c + T_{owc})/(aI^*_m) - T_c \quad (5)$$

where $$I^*_m = I_m + I_{rl}/a^2 \quad (5a)$$

$I_m$ is the moment of inertia of the power source rotor;
$T_m$ is the power source torque;
$T_c$ is the torque transmitted by clutch 62;
$T_{owc}$ is the torque transmitted by clutch 58; and
$I_{rl}$ is the moment of inertia of ring gear 44.

This equation is valid during operation in the first and second gear ratios and during the gear shift. In the first gear ratio, with clutch 58 engaged and the speed of shaft 32 constant, $T_c$ is equal to zero, $$T_{owc} = a \cdot Tm \quad (5b)$$

and equation (5) reduces to $$T_w = (1+a)(1+b)Tm$$

Similarly, during operation in the second gear ratio $$T_{owc} = 0 \text{ while } W_{rl} > 0 \quad (7a); \text{ and}$$

$$T_{owc} = a \cdot T_m - T_c \text{ while } W_{rl} = 0 \quad (7b)$$

therefore $$T_w = T_m[(1+a)(1+b) - a] \quad (8)$$

During the shift interval when the speed of the power source is changing to conform to the new gear ratio, the time rate of change of motor speed is given by $$dW_m/dtv = [T_m - (T_c + T_{owc})/a]/I^*_m \quad (9)$$

The one-way clutch cannot sustain a torque in the negative direction. Therefore, its torque is greater than 0 when it is engaged or locked and its torque is equal to 0 when it is overrunning. For friction clutch 62, its torque is equal to K * P, when it is slipping and its torque is less than K * P when it is engaged. The actual value of the torque transmitted by clutch 62 when it is not slipping is determined by the driving member.

These characteristics, along with equations (1), (5) and (9), permit detailed quantative analysis of gear ratio changes to be performed. The only additional information required is either an explicit or implicit specification for the variation of motor torque and the friction clutch as a function of time for the system state variables. In fact, $T_m$ and $T_c$ are the control variables that can be electronically regulated by an onboard computer to achieved acceptably smooth gear ratio changes.

A second step in the implementation of the control according to this invention is to develop a computer simulation of the gear ratio changes using the dynamic relationships and a closed loop control for the controlled variables. The control variables are the torque command for the power source, either an electrical motor or an internal combustion engine, and the pressure commands to the transmission actuators that produce the various speed ratios. These actuators are the hydraulic control elements, such as electrical solenoids, that control the pressure applied to the transmission clutches. The controlled variables are the wheel torque, which is used synonymously with transmission output torque, and the power source or engine speed.

The results of the computer simulation of this second step are used to determine the proper control law or compensation strategy to achieve gear ratio changes that conform to the gear shift criteria. Here the criteria for an acceptably smooth gear ratio change is one in which the output torque disturbance is kept to a minimum and the period during which the ratio change occurs is minimized in order to prevent clutch overheating and damage.

Equation (10) sets out the kinematic relationship among $T_{mc}$, the power supply torque command; $T_m$, the power supply torque; and $t_m$, the power supply response time constant, which is determined experimentally.

$$T_m + t_m(dT_m/dt) = T_{mc} \tag{10}$$

Equation (11) contains the kinematic relationship among the hydraulic pressure commands, $P_{cc}$, the hydraulic pressure applied to the friction element of the transmission, $P_c$, and the response time constant for the friction element pressure, $t_c$, which is determined experimentally.

$$P_c + t_c(dP_c/dt) = P_{cc} \tag{11}$$

While clutch 62 is slipping, its torque capacity, Tc, is expressed by equation (12a) wherein $K_p$ is a torque constant available to the computer, but when that clutch is fully engaged, equation (12b) expresses its torque capacity.

$$T_c = K_p \cdot P_c \tag{12a}$$

$$T_c = a \cdot T_m \tag{12b}$$

Referring now to FIG. 3, the block diagram shows the means by which the calculations are performed and components of the system whose operation is controlled by this method that employs the strategy of this invention. Block 90 represents an electronic computer that is continuously supplied at various input ports with electronic signals representing current wheel speed, motor torque and motor speed. Stored in the computer memory are gearset parameters a and b 106, 108, and the inertia $I^*_m$ 110. The torque produced by the power source 104 can be determined from the throttle angle setting, or the spark timing setting, or the air/fuel mixture or other relevant information from which the output torque of an internal combustion engine can be determined. The transmission output speed 102 is determined from a tachometer signal representative of the speed of shafts 32 or 34.

The computer also has stored within the main memory, accessible to the central processing unit, algorithms representing the dynamic and kinematic relationships of the transmission and power source. For example, block 92 represents the portion of the algorithm represented by equation (12a) and (12b). Block 94 represents the portion of the algorithm represented by equations (7a) and (7b).

The kinematic relationship of the transmission, equation (1) and the dynamic relationship of the transmission, equation (5) are represented respectively by blocks 96 and 97.

The power plant speed is a function of the power plant torque, $T_m$, the torque of clutch 62, $T_c$, and the torque of the one-way clutch 58, $T_{owc}$ and the inertias $I^*_m$ of the powertrain. Equation (13), represented by block 98 states this relationship, wherein $W_{mo}$ is the motor speed when time is zero, at the beginning of a gear ratio change.

$$W_m = \int_0^t [T_m - (T_c + T_{owc})/a]/I^*_m \, dt + W_{mo} \tag{13}$$

Block 100 within the computer represent an algorithm whose input includes the wheel speed 102 and any of the measures of the power output of the power source and inertia 110. The algorithm represented by block 100 includes a power schedule representing the relationship between the power produced by the power source and the wheel speed for each of the gear ratios of the transmission. This algorithm produces the commanded wheel torque that is supplied as input to the summing junction 112. The algorithm represented by block 100 also produces as output the commanded power source speed for the next gear ratio to which the transmission will be shifted. The commanded power source speed at the conclusion of the gear shift change is calculated on the basis of the wheel speed at the beginning of the gear shift using the speed ratio of the transmission to which the gear ratio change is to be made. The summing junction 114 has the commanded power source speed supplied as input.

The parameters such as the sizes of the ring and sun gears of the first and second gear sets are fixed by the design of the powertrain and are supplied as input by way of parameters a and b. Similarly, the motor inertia, the inertia of the first ring gear and the inertia $I_m^*$ are fixed by the design of the powertrain. These too are supplied as input.

From equations, (1–13), it is clear that the shift dynamics and the variation of the wheel torque are dictated by the variation of the commanded motor torque, the commanded clutch torque, the response time constant for the friction element pressure, the power plant torque response time constant, and the other parameters fixed by the powertrain design that are supplied as computer input. The local compensation represented by blocks 120 and 136 that characterize the power source and the transmission and appear in equations (10–11) are determined empirically by performing experiments with the power source and clutch hydraulics. From these tests the inner loop compensations necessary to achieve the desired response from the motor and the clutch are established. For example, the local compensation was established to set values for time constants tc and tp equal to 0.1 seconds. The time constants tm and tc are also fixed by the design of the power plant and the transmission hydraulic system, respectively. Therefore, the torque commands $T_{mc}$ and $P_{cc}$ must be appropriately varied by the controller to achieve the desired response.

Equations (1), (5), (7-11) are incorporated in a computer program with the parameters previously discussed to study the effect of various control strategies on output torque variation. Ideally, the output torque should remain constant during the shift because the shift is initiated by the control system based on efficiency considerations and therefore is not expected by the driver. The output torque or wheel torque command is therefore a function of the current wheel speed and the parameters that are a measure of the power output of the motor or engine, such as the throttle valve position, the spark timing or the air/fuel mixture.

An experimental determination of the parameters that characterize the power plant and the transmission is performed. In FIG. 3, the compensation for the transmission hydraulics is contained within block 116. It includes a summing junction 118; the local compensation 120, determined experimentally to satisfy the shift criteria; the hydraulic components 126 that supply pressurized hydraulic fluid to clutch 62; and the feedback loop 124, through which an electrical clutch pressure signal derived from the current supplied to the coil of the solenoid valve that operates the clutch valve is supplied to sensor 118. The output produced by the compensated hydraulics model is the clutch pressure signal $P_c$ which is supplied as input to either a mathematical model of the clutch represented by equation (12a) or clutch 62 itself. In either case, the clutch torque $T_c$ is the output produced $T_c$ and is supplied as input to the computer 90.

To determine the inner loop compensation necessary to achieve the desired torque response for the clutch, the clutch pressure-clutch torque relationship expressed in equation (12a) is determined experimentally from an open loop approach. In addition, the proportional, integral or derivative gains are determined for the compensation of block 120 in order to produce an acceptably small difference between the actual clutch pressure and the commanded clutch pressure and an acceptable time constants $t_c$. For example, it has been determined that the compensation of block 120 includes proportional gain and integral gain and that the shift criteria can be met when the associated time constant $t_c$ is approximately 0.1 seconds.

Similarly, the local or inner loop compensation necessary to achieve the desired torque response for the motor or power source is determined empirically using the model represented by block 128. This model includes a summing junction, 130 which receives the commanded power source torque and the actual power source torque signal, carried on feedback loop 132 from a sensor that determines the torque produced by the motor 134. The local compensation represented by block 136 for the motor receives as input the error signal, representing the difference between the commanded motor torque, and the actual motor torque and produces, in accordance with the requisite control strategy, a voltage or current signal supplied to the motor.

In accordance with equation (10), it has been determined that the local compensation will produce an output that satisfies the shift criteria when the motor torque response time constant is approximately 0.1 seconds.

Limiter 138 may be used to limit the motor torque command so that it does not exceed the maximum power capability of the power plant stored in computer memory. Similarly, limiter and converter 140 converts the commanded clutch torque to the commanded clutch pressure using the relationship determined empirically and expressed in the form of equation (12a). This may be used to limit the clutch torque command so that it does not exceed an acceptable rate of change of motor speed during the gear ratio change. Preferably, the commanded clutch torque should be within the limits $$a(Tm-Im\cdot d) < Tcc < a(Tm+Im\cdot d) \qquad (14)$$

where d is the rate of change of motor speed during the shift. Similarly, the commanded motor torque should be maintained within the limits.

$$Pmax/K_2\cdot W_{mc1} < Tmc < Pmax/K_2\cdot W_{mc2} \qquad (15)$$

where Pmax is the maximum clutch pressure, $K_2$ is a constant, $W_{mc1}$ and $W_{mc2}$ are the commanded motor speeds for the first and second gear ratios, respectively.

A purpose of the simulation is to establish the nature of the compensation represented by blocks 142 and 144 so as to satisfy the gear shift criteria. The compensation in the P-I-D (proportional, integral derivative) controller 142 has the typical form $$C = K_p[E + K_i \int E\cdot dt + K_d\cdot dE/dt] \qquad (16)$$

where C is the command signal for the motor torque or clutch torque; E is the error in the corresponding controlled variable, i.e., wheel torque or motor speed; $K_p$ is the proportional gain and conversion constant; $K_i$ is the integral gain; and $K_d$ is the derivative gain.

The determination of the preferred values to use for these gains can either be done manually by repeatedly executing the simulation or automatically by executing an optimization program that systematically varies the respective gains to minimize such factors as $$Ki \int_0^t T_{we}\cdot dt$$

where t is the time measured from the start of the gear ratio change; and $T_{we}$ is the wheel torque error.

In either case, whether calculated manually or automatically by the computer, this procedure yields control strategy solutions far more quickly, economically and less destructively than calibration procedures using the actual hardware.

Having described the preferred embodiment of my invention, what I claim and desire to secure by U.S. Letters Patent is:

1. In a powertrain system for controlling the gear ratio changes of a multiple gear ratio automatic transmission having a gearset and a clutch whose pressure magnitude determines the gear ratio at which the transmission is operating, the transmission driveably connecting a power source and the drive wheels of a motor vehicle, a method for controlling the powertrain comprising the steps of:

modeling the kinematic and dynamic characteristics of the power source, gearset and clutches by formulating mathematically the output torque Tw of the transmission and the angular speed Wm of the power source for each of the gear ratios of operation and for the period during a gear ratio change as a function of an updated output torque Tm of the power source and an updated clutch torque Tc;

determining experimentally a first local compensation feedback required to produce the updated power source torque response to a power source torque command Tmc such that the torque response requirements of the system are realizable;

determining experimentally a second local compensation feedback required to produce the updated clutch torque response to a clutch torque command Tcc such that the torque response requirements of the system are realizable;

generating a first error Twe defined as the difference between the actual transmission output torque and a transmission output torque command;

determining the compensation required to produce the power source torque command Tmc as a function of the first error Twe;

generating a second error Wme defined as the difference between the actual power source speed and a power source speed command;

determining the compensation required to produce the clutch torque command Tcc as a function of the second error Wme;

converting the clutch torque command to a clutch pressure command Pcc;

generating a third error Tme defined as the difference between the updated power source torque and a power source torque command and producing as output from the first local compensation feedback the updated power source torque;

generating a fourth error Pce defined as the difference between the updated clutch pressure and a clutch pressure command and producing as output from the second local compensation feedback the updated clutch pressure Pc;

controlling the clutch torque by applying the updated clutch pressure to the clutch; and controlling operation of the powertrain by issuing repetitively a transmission output torque command Twe and a power source speed command Wmc determined by use of the updated power source torque, the updated clutch pressure, and the formulation that relates said commands, said updated power source torque and said updated clutch pressure.

2. The method of claim 1 wherein determining the first local compensation feedback includes:

establishing a measure representing the output torque of the power source; and determining empirically the open loop relationship between the actual power source and the representative measure thereof over a range of power source torque; and determining the power source time constant tm from the relationship;

$$Tm+(tm)dTm/dt=Tmc$$

wherein d/dt is the first derivative with respect to time.

3. The method of claim 2 wherein producing the representative measure of the output torque of the power source includes producing a relation between an electrical voltage or current and a measure of the power source torque selected from the group consisting of the throttle position of an internal combustion engine, the phase displacement of the spark timing of an internal combustion engine in comparison to a reference spark timing and the air-fuel mixture ratio supplied to the cylinders of an internal combustion engine.

4. The method of claim 1 wherein determining the second local compensation feedback includes:

establishing a measure representing the clutch pressure;

determining empirically the open loop relationship between the actual clutch pressure and the representative measure thereof over a range of clutch pressure; and determining the clutch pressure time constant pc from the relationship $$Pc+pc\,dPc/dt=Pcc$$

wherein d/dt is the first derivative with respect to time.

5. The method of claim 4 further including determining experimentally over a range of clutch pressure the relation between the torque transmitted by the clutch and the clutch pressure.

6. The method of claim 1 further comprising limiting the power source torque command to the range $$\frac{HP\,max}{Ke(Wmc1)} < Tmc < \frac{HP}{K2(Wmc2)}$$

wherein HP max is the maximum power output of the power source, K2 is a proportionality constant, Wmc1 and Wmc2 are the power source speed commands calculated from the formulation for the transmission operating in the first and second gear ratios, respectively, with vehicle speed constant.

7. The method of claim 1 further comprising limiting the clutch torque command to the range $$a(Tm-Ima)<Tcc<a(Tm+Ima)$$

wherein a is a constant, Im is the moment of inertia of the power source, and $\alpha$ is the angular acceleration of the power source.

8. The method of claim 1 wherein determining the compensation required to produce the power source torque command Tmc includes determining the values for the constants Kp, $K_I$ and $K_d$ in the relationship $$Tmc=Kp[Twc+K_I\int Twc\,dt+K_DdTwe/dt]$$

wherein t is time and the integral is taken over a predetermined period of time.

9. The method of claim 1 wherein determining the compensation required to produce the clutch torque comamnd Tcc includes determining the values for the constants Kp, $K_I$ and $K_D$ in the relationship $$Tcc=Kp[Wme+K_I\int Wme\,dt+K_DdWme/dt].$$

* * * * *